(12) United States Patent
Paetsch

(10) Patent No.: US 8,107,943 B2
(45) Date of Patent: Jan. 31, 2012

(54) METHOD FOR PROVIDING DEVICE IDS IN A MOBILE RADIO DEVICE WHICH IDENTIFY SAID MOBILE RADIO DEVICE IN A MOBILE RADIO NETWORK

(75) Inventor: Frank Paetsch, Berlin (DE)

(73) Assignee: Teles AG (DE)

( * ) Notice: Subject to any disclaimer, the term of this patent is extended or adjusted under 35 U.S.C. 154(b) by 597 days.

(21) Appl. No.: 11/576,393

(22) PCT Filed: Sep. 14, 2005

(86) PCT No.: PCT/DE2005/001607
§ 371 (c)(1),
(2), (4) Date: Dec. 19, 2007

(87) PCT Pub. No.: WO2006/037285
PCT Pub. Date: Apr. 13, 2006

(65) Prior Publication Data
US 2008/0207185 A1   Aug. 28, 2008

(30) Foreign Application Priority Data

Oct. 1, 2004   (DE) .......................... 10 2004 048 345

(51) Int. Cl.
*H04M 3/00* (2006.01)
*H04B 1/38* (2006.01)
(52) U.S. Cl. .................... 455/419; 455/418; 455/558
(58) Field of Classification Search .................. 455/433, 455/418–420, 558
See application file for complete search history.

(56) References Cited

U.S. PATENT DOCUMENTS

| | | | |
|---|---|---|---|
| 6,542,731 | B1 | 4/2003 | Alos |
| 6,978,156 | B1 * | 12/2005 | Papadopoulos et al. ....... 455/558 |
| 2001/0005683 | A1 | 6/2001 | Zicker et al. |
| 2003/0142642 | A1 | 7/2003 | Agrawal et al. |
| 2003/0224823 | A1 * | 12/2003 | Hurst et al. .................... 455/558 |
| 2004/0037250 | A1 | 2/2004 | Refai |
| 2004/0157584 | A1 * | 8/2004 | Bensimon et al. ............. 455/411 |
| 2004/0204035 | A1 * | 10/2004 | Raghuram et al. ......... 455/553.1 |

FOREIGN PATENT DOCUMENTS

| | | |
|---|---|---|
| DE | 10260401 | 7/2004 |
| DE | 10311980 | 9/2004 |
| EP | 0468790 | 1/1992 |
| EP | 1441552 | 7/2004 |
| WO | WO03061203 | 7/2003 |
| WO | WO2004039113 | 5/2004 |
| WO | WO2004/073328 | 8/2004 |
| WO | WO2004086788 | 10/2004 |
| WO | WO2005107227 | 11/2005 |

* cited by examiner

*Primary Examiner* — Un C Cho
(74) *Attorney, Agent, or Firm* — Schmeiser, Olsen & Watts, LLP

(57) ABSTRACT

The invention relates to a method for providing device IDs in a mobile radio device (10; 30; 60) which identify said mobile radio device (10; 30; 60) in a mobile radio network (50). Said method comprises the following steps: several device IDs (21-1, 21-2, 21-3) are managed with the aid of a management and allocation system (20); a first device ID is selected among said several device IDs (21-1, 21-2, 21-3) in the management and allocation system; the first device ID is transmitted from the management and allocation system to a radio module (14) in the mobile radio device (10; 30; 60); and the first device ID is stored in the radio module (14) such that the first device ID is made available for identifying the mobile radio device (10; 30; 60) in the mobile radio network (50).

20 Claims, 1 Drawing Sheet

METHOD FOR PROVIDING DEVICE IDS IN A MOBILE RADIO DEVICE WHICH IDENTIFY SAID MOBILE RADIO DEVICE IN A MOBILE RADIO NETWORK

The invention concerns a method for providing a device identifier of a mobile radio device on a mobile radio network in a mobile radio device, a telecommunications configuration to implement the method and a mobile radio device for use with such a method.

BACKGROUND OF THE INVENTION

Giving mobile radio devices a unique equipment or serial number, also known as the IMEI (International Mobile Equipment Identity) is known under the standards for mobile radio networks currently in use. The IMEI is the fifteen-character code which is used by GSM (Global System for Mobile Communication) networks in current use to identify a mobile radio device belonging to a mobile radio network. The IMEI can usually be shown on the display of the mobile radio device by entering a specified code on the keypad of the mobile radio device. The IMEI is also printed inside most mobile radio devices, preferably in the battery space, if battery-powered mobile terminal equipment is involved.

TASK OF THE INVENTION

The invention is based on the task of finding a method for providing a device identifier of a mobile radio device on a mobile radio network in the mobile radio device in which the possibilities of versatile use of mobile radio devices on the mobile telecommunications are enhanced. In addition, a telecommunications configuration to implement the method and a mobile radio device for use with such a method are to be specified.

SUMMARY OF THE INVENTION

This task is solved according to the invention by a method with the characteristics of claim 1, a telecommunications configuration with the characteristics of claim 12 and a mobile radio device in accordance with claim 19. Preferred and advantageous embodiments of the invention form the subject of dependent sub-claims.

The invention provides a method for providing a device identifier of a mobile radio device on a mobile radio network in the mobile radio device, multiple device identifiers being managed in a management and allocation system, a first device identifier being selected from the multiple device identifiers in the management and allocation system and transferred to a radio module in the mobile radio device, and the first device identifier being saved in the radio module, so that the first device identifier for identifying the mobile radio device is provided on the mobile radio network.

The invention is based upon the concept of managing a number of device identifiers used for identifying mobile radio devices on the mobile radio network by using a management and allocation system and, depending upon the situation, selecting a first device identifier and providing it in a mobile radio device, so that this mobile radio device can identify itself on the mobile radio network by means of the device identifier provided. The use of such dynamic allocation of device identifiers creates a cost-effective, low-outlay possibility for implementing dynamic allocation of device identifiers. Independently of the current location of a mobile radio device on the mobile radio network, the mobile radio device can be allocated a desired device identifier. The management and allocation system may be implemented either as a local system in the mobile radio device itself or on a central server, preferably a host computer. In the case of a central server, the first device identifier is transferred to the mobile radio device by the central server.

The transfer of the device identifier to the mobile radio device by the central server can take place independently of the mobile radio network, although this requires the formation of a connection suitable for data transfer between the mobile radio device and the central system, e.g. in the form of a landline telephone network or radio or television signals. The network may be the internet.

The mobile radio device in which the telephone identifier is provided may be either mobile terminal equipment or a stationary mobile radio device with a radio module. A stationary mobile radio device may, for example, be a mobile telecommunications gateway, as described in the document DE 102 60 401 A1. The mobile terminal equipment is, for example, a normal mobile phone.

A purposeful embodiment of the invention provides for replacement of a previous identifier by the first device identifier in the radio module. In this way it is possible to provide a device identifier which has undergone multiple modifications in the mobile radio device.

Alternatively, a further development of the invention may provision for the first device identifier as application-related equipment identification alongside existing equipment identification in the mobile radio device. The application-related additional device identifier is practically allocated to an additional radio module. This makes it possible to equip a mobile radio device with multiple device identifiers dynamically, so that the mobile radio device can act on the mobile radio network by means of multiple device identifiers. This may be practical, for example in connection with testing the mobile radio network or simulating the response of the mobile radio device when it is used by users.

The additional application-related device identifier may lapse after a certain period. This means that it may no longer be used by the mobile radio device for telephone identification on the mobile radio network. The lapse may, for example, take place by verification of whether the telephone identifier is still valid on access to the application-related additional device identifier, which may be ensured by using a validity stamp with a limited life, itself checked on access to the saved device identifier.

A preferred embodiment of the invention may anticipate that a plug-in card containing a user identification code be provided in the mobile radio device, by using the central server, by identification data on the plug-in card and any authentication data being transferred to the mobile radio device by the central server.

This embodiment of the method facilitates allocation of both equipment identification and user recognition code in the mobile radio device. User recognition code in accordance with the current standard involves an IMSI (International Mobile Subscriber Identity). The IMSI is a unique code which clearly identifies the subscriber (the contracting partner of a mobile radio network operator). The IMSI is usually stored on a SIM (Subscriber Identity Module) card, which a telephone subscriber receives on conclusion of a contract. The first digits of the IMSI identify the network operator. The other digits can be used to determine the stock data of the mobile radio device subscriber stored by the network operator. The IMSI can be used to determine not only the identity of the subscriber, but also the subscriber's mobile radio device number, for which access to the stock data of the network operator is also necessary.

Simulation of the movement of a mobile radio device by the mobile radio network is facilitated by a further development of the invention, by limiting the provision of the first device identifier for identification of the mobile radio device on the mobile radio network to a predetermined period, transferring the first device identifier to another mobile radio device by data transfer by the management and allocation system and the first device identifier being saved retrievably in a memory of the other mobile radio device, so that the first device identifier is available for identification of the other mobile radio device on the mobile radio network.

DESCRIPTION OF PREFERRED EMBODIMENTS

The invention will be explained in more detail below using embodiments, with reference to the drawings.

A method for providing a device identifier identifying a mobile radio device on a mobile radio network will be explained below, using FIGS. 1 and 2. The device identifier is the IMEI (International Mobile Equipment Identity) explained above.

Figure 1:
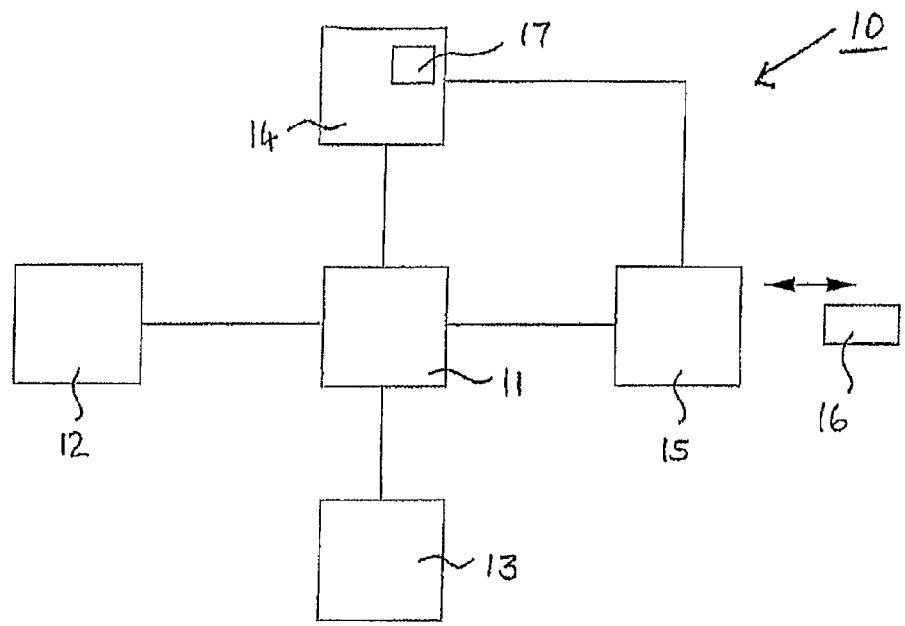
FIG. 1 is a block diagram of a mobile radio device.

FIG. 1 is a schematic representation of an embodiment of a mobile radio device 10. As well as the CPU 11 with an allocated memory 12, an input/output unit 13, a radio module 14 and a SIM card reader 15 are provided, all of which are connected to the CPU 11. A SIM card 16 can be inserted in and removed from the SIM card reader 15. The radio module 14 is a GSM (Global System for Mobile Communication) module, also known as a GSM engine. The GSM module 14 transmits and receives radio data over a bearer channel of a mobile radio network.

Figure 2:
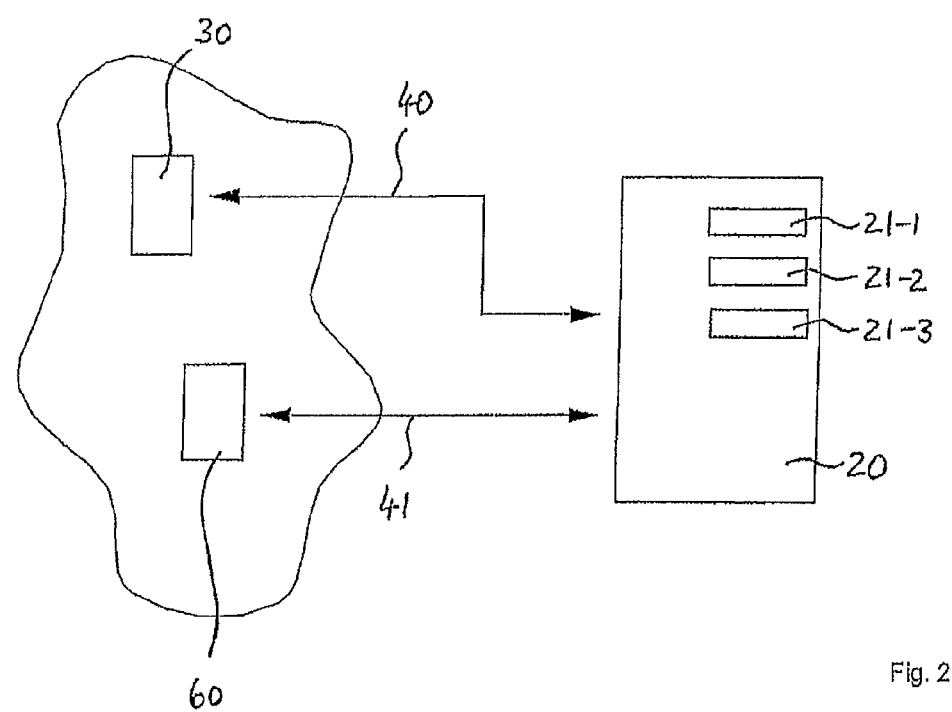
FIG. 2 is a schematic representation of a telecommunications configuration with a central system for the management of multiple device identifiers and multiple mobile radio devices.

FIG. 2 is a schematic representation of a telecommunications configuration with a central system 20 which comprises a management and allocation system for managing and allocating multiple device identifiers 21-1, 21-2, 21-3 and which is preferably a computer, a mobile radio device 30 and a further mobile radio device 60, connected to each other by data lines 40, 41. The multiple device identifiers 21-1, 21-2, 21-3 are managed by the central system 20. In accordance with the currently valid standard, the device identifiers 21-1 to 21-3 are IMEIs. If a device identifier is provided in the mobile radio device 30 so that the mobile radio device 30 can identify itself on a mobile radio network 50, one of the managed device identifiers 21-1 to 21-3 is selected in the central system 20 and transferred to the mobile radio device 30 over the data line 40.

The mobile radio device 30 has a structure as shown, for example, in FIG. 1. The central system 20 receives the device identifier through the input/output unit 13 and transfers it to the CPU 11. The CPU 11 has allocation resources so that the device identifier received is allocated to the radio module 14. In the radio module 14, the device identifier allocated by the CPU 11 is saved retrievably in a radio module memory 17, so that the device identifier is available for identification of the mobile radio device 30 on a mobile radio network 50.

The provision of a device identifier by using the central system 20 described may be used to test mobile radio networks in particular. A device identifier can be provided in the mobile radio device 30, independently of its location, which makes it possible for said mobile radio device 30 to identify itself on the mobile radio network 50 directly or by using another mobile radio network ("roaming") and thus carry out the normal functions of a mobile radio device. In this way, the behaviour of mobile radio device subscribers on mobile radio networks, for example, can be simulated. The flexible allocation of a device identifier makes it possible to simulate a movement of the mobile radio device 30 on the mobile radio network 50, by passing on the device identifier by means of dynamic allocation.

The method of flexible provision of a device identifier in a mobile radio device may be used in combination with dynamic provision of user recognition code in the mobile radio device. Such a method is extensively described in German patent application 103 11 980.9 and thus requires no further explanation here. Management of dynamically allocatable user recognition codes, which are IMSIs in accordance with the current standard, preferably takes place by means of the central system 20. In this case, the central system 20 also fulfils the function of a central SIM server, wherein the user recognition code provided on request in the mobile radio device 30 is also transferred to the mobile radio device 30 by the central system 20 through the data line 40, In this way, user identification code can be passed between mobile radio devices, so that, in particular, a certain device identifier and a certain user identification code can be dynamically allocated as a pair, particularly for simulation, test or maintenance purposes.

Provision may be made for the device identifier made available in the mobile radio device 30 in accordance with the method described above to be provided in the mobile radio device 30 for a limited period only and then transferred to the additional mobile radio device 60 for further use, so that the device identifier is then provided for use in the additional mobile radio device 60.

In a preferred embodiment, provision is made for the central system in the form of a management and allocation system to be embodied for flexible provision of a current device identifier and/or dynamic provision of a current user identification code as a local system integrated into an appropriate mobile radio device. The local system assumes the management and dynamic allocation of the current device identifier and/or the current user recognition code for the relevant mobile radio device in which it is implemented in a way analogous to that explained for the central system. For this purpose, a management and allocation system is practically formed in the mobile radio device. In this way, the local system can provide one or more radio modules in the relevant mobile radio device with an allocated device identifier. The local system operates as a SIM and/or IMEI server for the relevant mobile radio device, in accordance with the current standard. Such a local system may, for example, be implemented in a mobile radio device, as schematically shown in a possible embodiment in FIG. 1.

Provision may also be made for the provision of multiple device identifiers by using the local system in the relevant mobile radio device and provision of multiple user recognition codes by means of the central system, formed separately from the mobile radio devices, or vice versa. In this way, for example, very different simulations of the behaviour of mobile radio device subscribers may be carried out, particularly by initiating flexible allocation of device identifiers locally in the mobile radio device, whilst user identification codes are selected centrally and provided in a certain mobile radio device following remote date transfer.

The combined dynamic provision of device identifiers and user identification code permits a high degree of versatility in the use of mobile radio devices both within the scope of use of the mobile radio devices by mobile radio network subscribers and in connection with the maintenance and testing of mobile radio networks and the mobile radio devices used on them.

Characteristics of the invention disclosed in the description above, the claims and the drawings may be important to the realisation of the invention in its various embodiments, both individually and in any combination.

The invention claimed is:

1. A method for providing an International Mobile Equipment Identity (IMEI) device identifier of a mobile radio device on a mobile radio network in the mobile radio device comprising the steps of:
managing multiple International Mobile Equipment Identity (IMEI) device identifiers, using a management and allocation system;
managing multiple plug-in cards each with a user recognition code, using the management and allocation system;
selecting both a first International Mobile Equipment Identity (IMEI) device identifier from the multiple International Mobile Equipment Identity (IMEI) device identifiers and a first user recognition code from the multiple plug-in cards in the management and allocation system;
transferring the first International Mobile Equipment Identity (IMEI) device identifier and the first user recognition code from the management and allocation system to a radio module in the mobile radio device;
saving the first International Mobile Equipment Identity (IMEI) device identifier in the radio module so that the first International Mobile Equipment Identity (IMEI) device identifier for identification of the mobile radio device on the mobile radio network is used; and
wherein the first international mobile equipment identity (IMEI) device identifier and the first user recognition code are dynamically transferable as a pair from the mobile radio device to another mobile radio device.

2. The method in accordance with claim 1, wherein a previous International Mobile Equipment Identity (IMEI) device identifier in the radio module is replaced by the first International Mobile Equipment Identity (IMEI) device identifier.

3. The method in accordance with claim 1, wherein the management and allocation system is formed in a central server and the first International Mobile Equipment Identity (IMEI) device identifier after selection by the central server is transferred to the mobile radio device by remote data transfer.

4. The method in accordance with claim 1, wherein the management and allocation system is in the form of a local system in the mobile radio device and the first International Mobile Equipment Identity (IMEI) device identifier is transferred to the radio module by the local system following selection within the mobile radio device.

5. The method in accordance with claim 1, wherein the first International Mobile Equipment Identity (IMEI) device identifier lapses after a specific period.

6. The method in accordance with claim 1 wherein the first International Mobile Equipment Identity (IMEI) device identifier is provided in a mobile radio device embodied as a stationary mobile radio device.

7. The method in accordance with claim 1 wherein the first International Mobile Equipment Identity (IMEI) device identifier is provided in a mobile radio device configured as mobile terminal equipment.

8. The method in accordance with claim 1 wherein a plug-in card with a user recognition code is provided in the mobile radio device by using the central server, by transferring identification data on the plug-in card and any authentication data from the central server to the mobile radio device.

9. The method in accordance with claim 1, wherein the management and allocation system manages a plurality of International Mobile Equipment Identity (IMEI) device identifiers and a plurality of plug-in cards each plug-in card having a user recognition code.

10. The method in accordance with claim 9, wherein a first International Mobile Equipment Identity (IMEI) device identifier selected from the multiple International Mobile Equipment Identity (IMEI) device identifiers and a first user recognition code selected from the multiple plug-in cards are dynamically allocated to a mobile radio device as a pair.

11. The method in accordance with claim 10, wherein the first International Mobile Equipment Identity (IMEI) device identifier and the first recognition code are transferred as a pair from the mobile radio device to another mobile radio device.

12. A method for providing an International Mobile Equipment Identity (IMEI) device identifier of a mobile radio device on a mobile radio network in the mobile radio device comprising the steps of:
managing multiple International Mobile Equipment Identity (IMEI) device identifiers, using a management and allocation system;
selecting a first International Mobile Equipment Identity (IMEI) device identifier from multiple International Mobile Equipment Identity (IMEI) device identifier in the management and allocation system;
transferring the first International Mobile Equipment Identity (IMEI) device identifier from the management and allocation system to a radio module in the mobile radio device; and
saving the first International Mobile Equipment Identity (IMEI) device identifier in the radio module so that the first International Mobile Equipment Identity (IMEI) device identifier for identification of the mobile radio device on the mobile radio network is used;
wherein the provision of the first International Mobile Equipment Identity (IMEI) device identifier for identification of the mobile radio device on the mobile radio network is restricted in time, in that the first International Mobile Equipment Identity (IMEI) device identifier is transferred to another mobile radio device by the management and allocation system by means of remote data transfer and the first International Mobile Equipment Identity (IMEI) device identifier is saved retrievably in a memory facility of the other mobile radio device so that the first International Mobile Equipment Identity (IMEI) device identifier is provided on the mobile radio network for identification of another mobile radio device.

13. A telecommunications configuration for implementation of the method in accordance with claim 1, comprising:
a management and allocation system which manages and provides multiple International Mobile Equipment Identity (IMEI) device identifier and
at least one mobile radio device
wherein the management and allocation system selects a first International Mobile Equipment Identity (IMEI) device identifier from the multiple International Mobile Equipment Identity (IMEI) device identifiers and transfers it to a radio module of the at least one mobile radio device and wherein the at least one mobile radio device uses the first International Mobile Equipment Identity (IMEI) device identifier after transfer to the radio module for equipment identification on a mobile radio network;

wherein the management and allocation system both manages and provides multiple International Mobile Equipment Identity (IMEI) device identifiers and multiple plug-in cards each with a user recognition code, wherein the management and allocation system is adapted to select both a first International Mobile Equipment Identity (IMEI)device identifier from the multiple International Mobile Equipment Identity (IMEI) device identifiers and a first user recognition code from the multiple plug-in cards, to transfer these to a radio module of the at least one mobile radio device as a pair, and wherein the first International Mobile Equipment Identity (IMEI) device identifier and the first user recognition code are dynamically transferable as a pair from one mobile radio device to another mobile radio device.

14. The telecommunications configuration in accordance with claim 13, wherein the at least one mobile radio device is mobile terminal equipment.

15. The telecommunications configuration in accordance with claim 13, wherein the at least one mobile radio device is a stationary mobile radio device.

16. The telecommunications configuration in accordance with claim 13, wherein the management and allocation system is formed in at least one mobile radio device.

17. The telecommunications configuration in accordance with claim 13, wherein the management and allocation system is formed in a central server.

18. A mobile radio device comprising:
   means of communication for communicating with a management and allocation system which manages multiple International Mobile Equipment Identity (IMEI) device identifier and provides them for selective use, the means of communication comprising a means of reception for receiving a first International Mobile Equipment Identity (IMEI) device identifier from the management and allocation system and
   means of allocation to allocate the received first International Mobile Equipment Identity (IMEI) device identifier to a radio module, so that the first International Mobile Equipment Identity (IMEI) device identifier for identification of the mobile radio device is provided on a mobile radio network;
   wherein the means for a communication comprise a means of reception for receiving as a pair a first International Mobile Equipment Identity (IMEI) device identifier and a first user recognition code from the management and allocation centre, and wherein the mobile radio device is adapted that the first International Mobile Equipment Identity (IMEI) device identifier and the first user recognition code are dynamically transferable as a pair from the mobile radio device to another mobile radio device.

19. The mobile radio device in accordance with claim 18, further comprising a further radio module, to which a further International Mobile Equipment Identity (IMEI) device identifier is allocated by using the means of allocation.

20. A management and allocation system for providing an International Mobile Equipment Identity (IMEI) device identifier of a mobile radio device, the system comprising:
   means for managing and providing multiple International Mobile Equipment Identity (IMEI) device identifiers, each International Mobile Equipment Identity (IMEI) being able to identify a mobile radio device in a mobile radio network,
   means for managing and providing multiple plug-in cards each with a user recognition code,
   wherein the management and allocation system is adapted to select both a first International Mobile Equipment Identity (IMEI) device identifier from the multiple International Mobile Equipment Identity (IMEI) device identifiers and a first user recognition code from the multiple plug-in cards, to transfer these to a radio module of a mobile radio device as a pair,
   wherein the first international mobile equipment identity (IMEI) device identifier and the first user recognition code are dynamically transferable as a pair from one mobile radio device to another mobile radio device.

* * * * *